United States Patent [19]

Imazeki et al.

[11] 4,412,295
[45] Oct. 25, 1983

[54] TRACER CONTROL EQUIPMENT

[75] Inventors: Ryoji Imazeki; Etsuo Yamazaki, both of Hachioji, Japan

[73] Assignee: Fujitsu Fanuc Limited, Tokyo, Japan

[21] Appl. No.: 362,667

[22] Filed: Mar. 29, 1982

Related U.S. Application Data

[63] Continuation of Ser. No. 141,794, Apr. 18, 1980, abandoned.

[30] Foreign Application Priority Data

Oct. 24, 1978 [JP] Japan .................. 53-130836

[51] Int. Cl.³ .................. G06F 15/46; G05B 19/42
[52] U.S. Cl. .................. 364/520; 318/571; 318/578; 364/474
[58] Field of Search ........ 364/474, 475, 520, 167-171; 318/571, 578, 567, 570, 568, 579

[56] References Cited

U.S. PATENT DOCUMENTS

| | | | |
|---|---|---|---|
| 3,559,021 | 1/1971 | Bingham, Jr. .................. | 318/571 X |
| 3,746,956 | 7/1973 | Takegawa .................. | 318/579 X |
| 3,875,382 | 4/1975 | Cutler .................. | 318/573 |
| 3,916,571 | 11/1975 | Seidel .................. | 318/578 X |
| 4,122,634 | 10/1978 | Nishimura et al. .................. | 318/578 X |
| 4,224,670 | 9/1980 | Yamazaki .................. | 318/578 X |

Primary Examiner—Joseph F. Ruggiero
Attorney, Agent, or Firm—Staas & Halsey

[57] ABSTRACT

In a tracer control equipment which calculates a trace direction and a trace velocity using signals from a tracer head tracing the model surface and performs tracer control in accordance with the calculation results, there are provided a memory for storing numerical command data and means for reading out the numerical command data by a processor from the memory, whereby to add a numerical control function for positioning control to the tracer control equipment.

6 Claims, 1 Drawing Figure

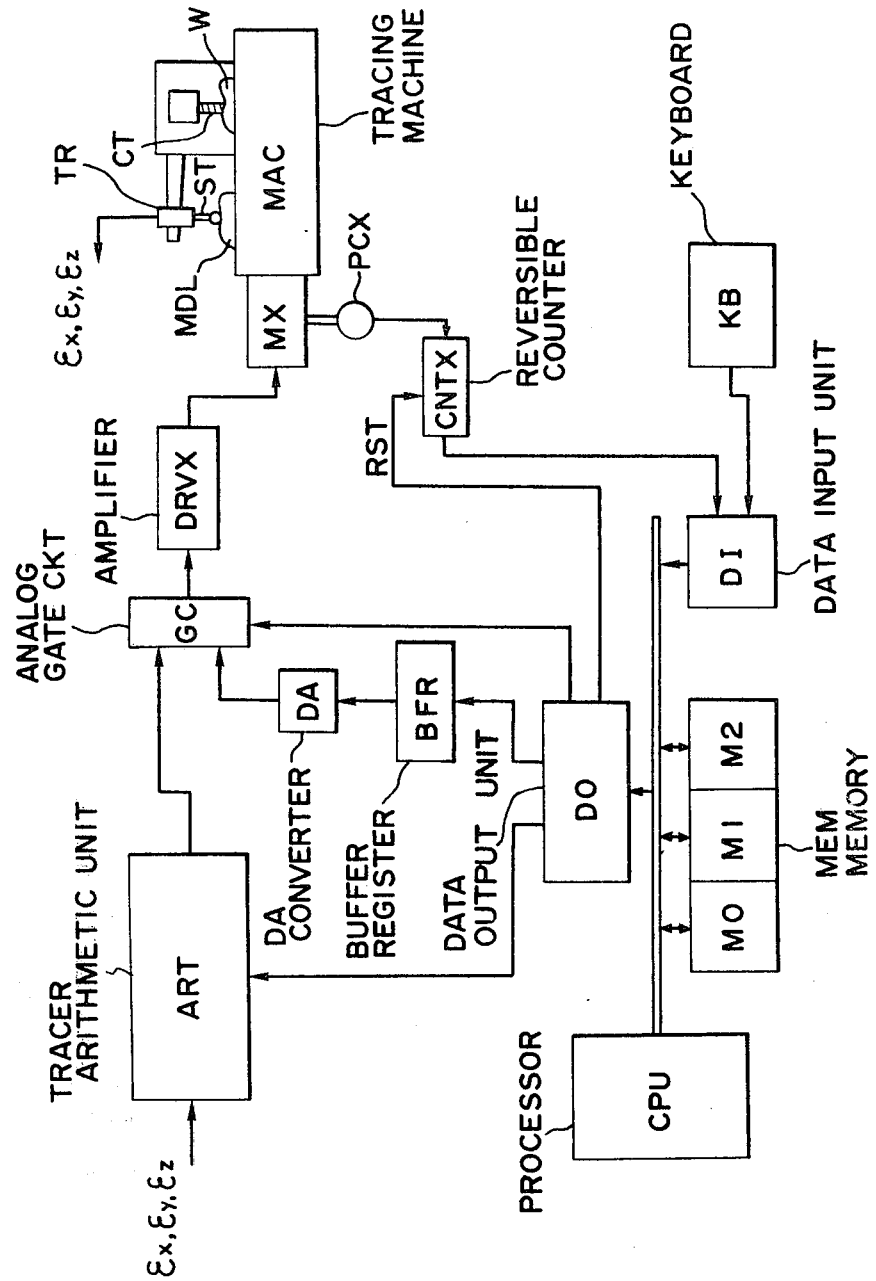

TRACER CONTROL EQUIPMENT

This is a continuation of application Ser. No. 141,794 filed Apr. 18, 1980, abandoned.

BACKGROUND OF THE INVENTION

1 Field of the Invention

This invention relates to tracer control equipment which has both a tracer control function and a numerical control function.

2 Description of the Prior Art

Tracer controlled machining may in some cases require numerical control for positioning or the like using a numerical command according to a work being machined. A method that has been employed in the past to meet such requirements is to combine a tracer control equipment with a numerical control equipment to share a motor drive circuit and selectively perform the numerical control and the tracer control by switching a command to the motor drive circuit for each particular operation. With this method, however, during the tracer control the expensive numerical control equipment is not used at all, and both pieces of equipment have the jog feed, rapid feed, handle feed and so forth; therefore, this method is highly wasteful in many points.

SUMMARY OF THE INVENTION

Accordingly, it is an object of the present invention to provide a tracer control equipment which is provided with a processor and which is designed to perform a numerical control function for positioning control and the like through utilization of the processor so that both tracer control and numerical control may be effected with an economical arrangement of the tracer control equipment alone.

Briefly stated, in the tracer control equipment of this invention, there are provided a memory for storing numerical command data and means for reading out the numerical command data from the memory under the control of a processor to perform positioning control of a tracing machine in accordance with the data.

BRIEF DESCRIPTION OF THE DRAWING

The accompanying drawing shows in block form the principal parts of an embodiment of the present invention.

DESCRIPTION OF THE PREFERRED EMBODIMENT

In the accompanying drawing, reference character ART indicates a tracer arithmetic unit including a composite displacement calculation circuit, a velocity calculation circuit and a distribution circuit; GC designates an analog gate circuit; DRVX identifies an amplifier; MX denotes a servo motor; MAC represents a tracing machine; MDL shows a model; TR refers to a tracer head; ST indicates a stylus; CT designates a cutter; W identifies a work; PCX denotes a position detector; CNTX represents a reversible counter for counting pulses available from the position detector; DO shows a data output unit; BFR refers to a buffer register; DA indicates a D-A converter; MEM designates a memory composed of a control program part MO, a data memory part M1 and a work memory part M2; DI identifies a data input unit; KB denotes a keyboard; and CPU represents a processor. In the drawing, only one drive axis (X axis) is shown for convenience of description.

When the stylus ST is brought into contact with the model MDL and traces on the surface thereof by the driving of the servo motor MX, the tracer head TR provides to the tracer arithmetic unit ART displacement signals $\epsilon_x$, $\epsilon_y$ and $\epsilon_z$ corresponding to the displacement of the stylus ST. The tracer arithmetic unit ART derives a composite displacement signal, $\epsilon = \sqrt{\epsilon_x{}^2 + \epsilon_y{}^2 + \epsilon_z{}^2}$, and displacement direction signals $\sin\theta$ and $\cos\theta$ from the abovesaid displacement signals and produces a velocity command signal based on the thus obtained signals and a reference displacement signal $\epsilon_0$ applied separately of the abovesaid displacement signals. The velocity command signal thus obtained is provided to the analog gate circuit GC. Since the analog gate circuit GC applies the velocity command signal to a selected one of amplifiers respectively corresponding to one of the drive axes, the servo motor is driven in response to the velocity command signal amplified by the selected amplifier to bodily feed the cutter and the tracer head TR. These operations are well-known in the art.

Data defining the tracer operation is entered from the keyboard KB and so forth and stored in the memory MEM. The processor CPU reads out the data from the memory MEM in response to the tracer operation and controls the tracing path in accordance with the data. For example, whether or not the stylus ST has reached a trace turning position, trace end position or the like is checked by making a comparison between stylus position information from the reversible counter CNTX and set position information stored in the data memory part M1.

According to the present invention, in such a tracer control equipment provided with a processor for controlling the tracing path and the like, there are provided the buffer register BFR for storing a velocity command and like numerical command data and the D-A converter DA for converting the output from the buffer register BFR to analog form for input to the analog gate circuit GC. The buffer register BFR and the D-A converter DA are placed under the control of the central processor CPU to perform positioning control using the numerical command data.

For the positioning control, numerical command data such as the distance, direction and velocity of movement of the cutter and so forth are entered from the keyboard KB and so on to be prestored in the data memory part M1 of the memory MEM via the data input unit DI. Placing the cutter CT at its initial start point and depressing a start button (not shown), the processor CPU changes over the analog gate circuit GC and, at the same time, reads out the feed rate data and the data representing the feed direction stored in the memory MEM and writes the data in the buffer register BFR via the data output unit DO. In this case, the feed direction is written in the form of a positive or negative sign in the buffer register BFR. The output from the buffer register BFR is converted by the D-A converter into an analog signal, which is applied as a velocity command signal via the analog gate circuit GC to the amplifier DRVX. The servo motor MX is driven in correspondence to the velocity command signal to shift the cutter CT and the stylus ST of the tracer head. The distance of movement of the cutter CT and the stylus ST can be detected from the content of the reversible counter CNTX which counts output pulses available from the position detector PCX mounted on the servo motor MX.

The processor CPU reads out the content of the reversible counter CNTX via the data input unit DI with a constant period and adds the count content of the reversible counter CNTX to the previous stored content and stores the sum in some area of the work memory part M2. The distance of movement of the cutter CT stored in the work memory M2 and the distance-of-movement data prestored in the data memory part M1 from the keyboard KB or the like are read out by the processor CPU with a constant period and compared with each other. When it is decided by this comparison that the actual distance of movement of the cutter CT matches with its preset distance, the processor CPU makes the content of the buffer register BFR zero via the data output unit DO to stop the servo motor from operation, thus completing the positioning control. Since the reversible counter CNTX is reset by a reset signal RST after its content is read out, its capacity is sufficient only to count the output pulses of the position detector PCX within a certain period; therefore, the reversible counter CNTX can be formed by a register of relatively small capacity. In the positioning described above, the distance of movement of the cutter CT is specified in advance. But the positioning can also be performed by increasing the capacity of the reversible counter CNTX so that its content indicates the current position of the cutter position of the cutter CT at all times, storing in the memory MEM data on a desired final position of the cutter CT and comparing this data with the current position data of the reversible counter CNTX by the processor CPU.

In the case of carrying out, by such positioning control, what is called straight-line cutting which effects a cutting operation while the cutter moves parallel to its axial direction, the accuracy of the cutter feeding speed is also important besides the distance of movement of the cutter, and the cutter must be fed faithfully at a specified feed rate. However, if there is in the servo system or the like an offset of, for example, several millimeters per minute in terms of the feed rate, then the cutter is not fed at the specified velocity; this error poses a problem especially when the feeding speed is low, for instance, five to ten-odd millimeters per minute. The present invention also permits correction of such a feed rate error, as described hereunder.

Namely, after writing in the buffer register BFR feed velocity data stored in the memory MEM to start feeding by the servo motor MX, the processor CPU reads out the content of the reversible counter CNTX to calculate therefrom the actual moving velocity of the cutter CT, compares the calculated cutter moving velocity and the abovesaid feed velocity data and rewrites the content of the buffer register BFR so that the both velocities may match with each other. For this rewriting, use can be made of feed velocity correction data prestored in the memory MEM.

As has been described in the foregoing, the tracer control equipment of the present invention is equipped with a numerical control function through utilization of a processor controlling the tracing path and so forth. Accordingly, this tracer control equipment is capable of effecting both tracer control and numerical control with an economical arrangement, as compared with a combination of a tracer control device and a numerical control device as has heretofore been employed.

It will be apparent that many modifications and variations may be effected without departing from the scope of the novel concepts of this invention.

What is claimed is:

1. A tracer control device which calculates a trace direction and a trace velocity for tracing control using displacement signals from a tracer head tracing the surface of a model and a predetermined desired value for a composite displacement signal, and which performs the tracing control for tracing the model by moving the tracer head selectively along a plurality of machine axes of said device in accordance with the calculated trace direction and trace velocity values, said device comprising:

a memory for storing predetermined numerical command data in digital form for providing selective numerical control of the position of said tracer head apart from said tracing control;

an analog gate circuit including means for being selectively operated for said tracing control and for said numerical control of the position of said tracer head, and having outputs for selectively driving said tracer head along said machine axes of said device for tracing control and for said numerical control of the position of the tracer head; and control means, including a processor, for determining whether said tracing control or said numerical control of the position of the tracer head is to be performed, for selectively reading out the numerical command data from the memory, and for performing said numerical control of the position of the tracer head in accordance with the selected numerical command data;

wherein said control means comprises:

means for selectively operating said analog gate circuit for said tracing of said model and for said numerical control of the position of the tracer head;

a buffer register in which the processor sets digital data corresponding to a direction and velocity of the motion of the tracer head according to the selected numerical command data for performing said numerical control of the position of the tracer head;

A D-A converter for converting said digital data set in the buffer register to a respective analog signal, and to provide each said analog signal to said analog gate circuit to selectively drive said tracer head along said machine axes for performing said numerical control of the position of said tracer head;

a plurality of servo motors and respectively coupled position detectors, for providing motion of said tracer head along the respective machine axes of the tracer control device for said numerical control of the position of the tracer head, and means for driving each said servo motor according to each respective analog signal as a velocity command signal, each said position detector providing output pulses corresponding to the distance moved along respective machine axes; and a respective reversible counter for counting the output of each said position detector;

wherein said control means selectively reads the count content of each said respective reversible counter for comparing the count content with respective numerical command data stored in the memory, for providing said numerical control of the position of the tracer head.

2. The device of claim 1, wherein said count content of each said respective reversible counter represents the incremental change of position of the respective servo motor, said processor reads the count content of each respective reversible counter and accumulates said count contents in said memory, and each respective reversible counter is cleared after each reading of the count content.

3. The device of claim 1, said count content of each said reversible counter representing the respective cumulative change of position of the respective servo motor.

4. The device of claim 1, wherein said numerical command data includes feed velocity correction data, and said control means comprises means for computing the actual velocity of said tracer head based on the count content of each respective reversible counter and said numerical command data, and wherein the content of said buffer register is rewritten using said feed velocity correction data when the velocity of the tracer head does not correspond to the desired velocity of the tracer head.

5. The device of claim 2, wherein said numerical command data includes feed velocity correction data, and said control means comprises means for computing the actual velocity of said tracer head based on the count content of each respective reversible counter and said numerical command data, and wherein the content of said buffer register is rewritten using said feed velocity correction data when the velocity of the tracer head does not correspond to the desired velocity of the tracer head.

6. The device of claim 3, wherein said numerical command data includes feed velocity correction data, and said control means comprises means for computing the actual velocity of said tracer head based on the count content of each respective reversible counter and said numerical command data, and wherein the content of said buffer register is rewritten using said feed velocity correction data when the velocity of the tracer head does not correspond to the desired velocity of the tracer head.

* * * * *

UNITED STATES PATENT AND TRADEMARK OFFICE
CERTIFICATE OF CORRECTION

PATENT NO. : 4,412,295
DATED : 25 October 1983
INVENTOR(S) : Imazeki et al

It is certified that error appears in the above-identified patent and that said Letters Patent is hereby corrected as shown below:

Front page, [63] Related U.S. Application Data, "141,794" should be --141,474--.

Column 1, line 4, "141,794" should be --141,474--.

Column 2, line 7, "$\varepsilon=\sqrt{\varepsilon_{x-}}$" should be --$\varepsilon=\sqrt{\varepsilon_x^2-}$--;

line 8, "$^2+\varepsilon y^2+\varepsilon z^2$" should be --$\overline{+\varepsilon y^2+\varepsilon z^2}$--.

Column 3, line 53, after "that" delete "the".

Signed and Sealed this

Twenty-fifth Day of September 1984

[SEAL]

Attest:

GERALD J. MOSSINGHOFF

Attesting Officer  Commissioner of Patents and Trademarks